(12) United States Patent
Yamaguchi et al.

(10) Patent No.: US 9,777,077 B2
(45) Date of Patent: Oct. 3, 2017

(54) RUBBER PARTICLE FRACTIONATION METHOD, TRANSPORT METHOD, AND STORAGE METHOD

(71) Applicants: SUMITOMO RUBBER INDUSTRIES, LTD., Kobe-shi, Hyogo (JP); TOHOKU UNIVERSITY, Sendai-shi, Miyagi (JP)

(72) Inventors: Haruhiko Yamaguchi, Kobe (JP); Yukino Inoue, Kobe (JP); Seiji Takahashi, Sendai (JP); Toru Nakayama, Sendai (JP); Satoshi Yamashita, Sendai (JP)

(73) Assignees: SUMITOMO RUBBER INDUSTRIES, LTD., Kobe-Shi, Hyogo (JP); TOHOKU UNIVERSITY, Sendai-Shi, Miyagi (JP)

( * ) Notice: Subject to any disclaimer, the term of this patent is extended or adjusted under 35 U.S.C. 154(b) by 0 days.

(21) Appl. No.: 15/106,560

(22) PCT Filed: Dec. 16, 2014

(86) PCT No.: PCT/JP2014/083188
§ 371 (c)(1),
(2) Date: Jun. 20, 2016

(87) PCT Pub. No.: WO2015/107824
PCT Pub. Date: Jul. 23, 2015

(65) Prior Publication Data
US 2017/0037156 A1   Feb. 9, 2017

(30) Foreign Application Priority Data

Jan. 16, 2014 (JP) ................. 2014-005968
May 1, 2014 (JP) ................. 2014-094734

(51) Int. Cl.
| | | |
|---|---|---|
| *C08C 1/10* | (2006.01) | |
| *C08C 1/06* | (2006.01) | |
| *C08J 3/05* | (2006.01) | |
| *C08L 7/02* | (2006.01) | |

(52) U.S. Cl.
CPC .............. *C08C 1/10* (2013.01); *C08C 1/06* (2013.01); *C08J 3/05* (2013.01); *C08L 7/02* (2013.01); *C08J 2307/02* (2013.01)

(58) Field of Classification Search
CPC ....................................................... C08C 1/10
USPC ............................................................ 528/502
See application file for complete search history.

(56) References Cited

U.S. PATENT DOCUMENTS

2011/0201771 A1   8/2011  Puskas et al.

FOREIGN PATENT DOCUMENTS

| CN | 102321197 A | 1/2012 |
|----|---|---|
| JP | 2010-164537 A | 7/2010 |
| JP | 2010-168414 A | 8/2010 |
| JP | 2011-74392 A | 4/2011 |
| JP | 2013-162776 A | 8/2013 |

OTHER PUBLICATIONS

English machine translation for CN-102321197-A, dated Jan. 18, 2012.
English machine translation for JP-2010-164537-A, dated Jul. 29, 2010.
English machine translation for JP-2010-168414-A, dated Aug. 5, 2010.
English machine translation for JP-2011-74392-A, dated Apr. 14, 2011.
English machine translation for JP-2013-162776-A, dated Aug. 22, 2013.
Kawahara et al., "Structure of Natural Rubber," Journal of the Society of Rubber Science and Technology, vol. 82, No. 10, 2009, pp. 417-423, along with an English abstract.

*Primary Examiner* — Terressa Boykin
(74) *Attorney, Agent, or Firm* — Birch, Stewart, Kolasch & Birch, LLP

(57) ABSTRACT

The present invention provides an effective method for fractionating rubber particles in natural rubber latex by particle size, and effective methods for transporting or preserving rubber particles. The present invention relates to a method for fractionating rubber particles in natural rubber latex by particle size, the method including centrifuging natural rubber latex in at least four stages at forces of 800 to 3,000×g, 6,500 to 10,000×g, 17,000 to 22,000×g, and 40,000 to 60,000×g to fractionate rubber particles. The present invention also relates to methods for transporting or preserving rubber particles, the methods including the steps of adding a buffer solution and an antioxidant to natural rubber latex or rubber particles fractionated from natural rubber latex; and freezing a mixture prepared in the above step.

3 Claims, No Drawings

RUBBER PARTICLE FRACTIONATION METHOD, TRANSPORT METHOD, AND STORAGE METHOD

TECHNICAL FIELD

The present invention relates to a method for fractionating rubber particles in natural rubber latex by particle size, and methods for transporting or preserving rubber particles.

BACKGROUND ART

Nowadays natural rubber (one example of polyisoprenoids) for use in industrial rubber products can be harvested from *Hevea brasiliensis* (Para rubber tree) belonging to the family Euphorbiaceae.

Natural rubber is found mainly in the latex produced in specific cells called latex vessels of rubber trees, and the latex is processed to produce natural rubber. The latex is generally harvested from rubber trees by making groove-like incisions in the trunk of the trees (tapping) and collecting the latex as it oozes from the cut latex vessels.

Natural rubber exists in the form of particles in the latex. It has a particle size distribution with plural peaks, which indicates that rubber particles of different sizes are present in natural rubber latex (Non-Patent Literature 1). Further, it has been reported that the rubber synthesis activity of rubber particles differs depending on particle size; rubber particles having a smaller particle size have higher rubber biosynthesis activity than rubber particles having a larger particle size.

Since the characteristics of rubber particles in the latex differ depending on particle size as described above, in order to prepare rubber particles having preferable properties from the latex it is ideal to fractionate rubber particles from the latex by particle size to prepare a natural rubber latex having a high content of rubber particles of a desired size.

However, it has been difficult to fractionate a large amount of rubber particles in the latex by particle size with high accuracy. For example, since rubber particles aggregate very easily, when gel permeation chromatography or other techniques usually used for fractionating proteins or the like by size are used, the throughput is low and it is thus very difficult to fractionate a large amount of rubber particles by particle size with high accuracy.

Rubber particles may be fractionated by particle size using antibodies (Patent Literature 1). This method, however, involves preparing different antibodies that bind to each of the proteins on different sized rubber particles.

As for natural rubber, there are many studies focused on the rubber synthesis activity of rubber particles, and it is important to maintain the rubber synthesis activity of rubber particles. However, when the latex is stored as it is, problems such as aggregation of rubber particles or brown discoloration occur, resulting in impairment of the rubber synthesis activity of the rubber particles. Therefore, there is also a need for a method which can acquire rubber particles without impairing their rubber synthesis activity.

CITATION LIST

Patent Literature

Patent Literature 1: JP 2010-164537 A

Non-Patent Literature

Non-Patent Literature 1: SeiichiKawahara, et al., NIPPON GOMU KYOKAISHI (Journal of the Society of Rubber Science and Technology, Japan), Vol. 82, No. 10, pp. 417-423 (2009)

SUMMARY OF INVENTION

Technical Problem

The present invention aims to provide an effective method for fractionating rubber particles in natural rubber latex by particle size. The present invention also aims to provide methods for transporting or preserving rubber particles, which can maintain the rubber synthesis activity of the rubber particles.

Solution to Problem

The present invention relates to a method for fractionating rubber particles in natural rubber latex by particle size, the method including
centrifuging natural rubber latex in at least four stages at forces of 800 to 3,000×g, 6,500 to 10,000×g, 17,000 to 22,000×g, and 40,000 to 60,000×g to fractionate rubber particles.

Preferably, in the method, a buffer solution is added to the natural rubber latex before centrifugation.

The buffer solution is added to the natural rubber latex preferably in an amount equal to or less than four times an amount of the natural rubber latex, more preferably in an amount equal to or less than an amount of the natural rubber latex, still more preferably in an amount equal to or less than one-half of an amount of the natural rubber latex.

The natural rubber latex is preferably centrifuged in five stages at forces of 800 to 1,600×g, 1,800 to 3,000×g, 6,500 to 10,000×g, 17,000 to 22,000×g, and 40,000 to 60,000×g to fractionate rubber particles.

The present invention also relates to a method for transporting rubber particles, including:
a step 1-1 of adding a buffer solution and an antioxidant to natural rubber latex or rubber particles fractionated from natural rubber latex; and
a step 1-2 of freezing a mixture prepared in the step 1-1.

In the transportation method, the antioxidant preferably contains a mercapto group.

In the transportation method, the mixture is preferably frozen at a temperature of −10° C. or lower, more preferably at a temperature of −20° C. or lower.

The present invention also relates to a method for preserving rubber particles, including:
a step 2-1 of adding a buffer solution and an antioxidant to natural rubber latex or rubber particles fractionated from natural rubber latex; and
a step 2-2 of freezing a mixture prepared in the step 2-1.

In the preservation method, the antioxidant preferably contains a mercapto group.

In the preservation method, the mixture is preferably frozen at a temperature of −10° C. or lower, more preferably at a temperature of −20° C. or lower, still more preferably at a temperature of −80° C. or lower.

Advantageous Effects of Invention

In the method for fractionating rubber particles of the present invention, rubber particles of a desired size can be fractionated by centrifuging natural rubber latex in stages. This is based on the fact that the centrifugal force for separating rubber particles differs depending on the particle size of the rubber particles.

In the methods for transporting or preserving rubber particles of the present invention, the rubber synthesis activity of rubber particles can be maintained by adding a buffer solution and an antioxidant to natural rubber latex or rubber particles fractionated from natural rubber latex and freezing the mixture.

DESCRIPTION OF EMBODIMENTS (Method for Fractionating Rubber Particles)

As described above, it is known that a mixture of rubber particles of different sizes is present in natural rubber latex. The present inventors conducted various studies to fractionate rubber particles from the latex by particle size.

As a result of the studies, the present inventors focused on the fact that the mobility of rubber particles during centrifugation differs depending on the particle size of the rubber particles, and found that rubber particles of a desired size can be efficiency fractionated from the latex by stepwise varying the centrifugal force during centrifugation.

That is, the present invention relates to a method for fractionating rubber particles in natural rubber latex by particle size, the method including centrifuging natural rubber latex in at least four stages at forces of 800 to 3,000×g, 6,500 to 10,000×g, 17,000 to 22,000×g, and 40,000 to 60,000×g to fractionate rubber particles.

Since this method allows rubber particles of a desired size to be efficiently fractionated from the latex, the rubber synthesis activity of rubber particles of any given size can be evaluated. Therefore, the method of the present invention is an important tool to evaluate the rubber synthesis activity of rubber particles, and particularly the relationship between the particle size of rubber particles and the rubber synthesis activity thereof.

In the present invention, the natural rubber latex is centrifuged in at least four stages at forces of 800 to 3,000×g, 6,500 to 10,000×g, 17,000 to 22,000×g, and 40,000 to 60,000×g. As used hereinafter, the centrifugation at a force of 800 to 3,000×g is referred to as first centrifugation, the centrifugation at a force of 6,500 to 10,000×g is referred to as second centrifugation, the centrifugation at a force of 17,000 to 22,000×g is referred to as third centrifugation, and the centrifugation at a force of 40,000 to 60,000×g is referred to as fourth centrifugation.

In the present invention, the first to fourth centrifugations are performed preferably in the following order: the first centrifugation, the second centrifugation, the third centrifugation, and the fourth centrifugation. A series of centrifugation at stepwise increasing centrifugal forces allows rubber particles to be stepwise fractionated in order from the larger particle size to the smaller particle size.

The following describes embodiments in which the first, second, third, and fourth centrifugations are performed in the stated order. The first and second centrifugations allow rubber particles having a large particle size (large rubber particle, LRP) to be fractionated, while the third and fourth centrifugations allow rubber particles having a small particle size (small rubber particle, SRP) to be fractionated.

In the first centrifugation, the natural rubber latex is centrifuged at a force of 800 to 3,000×g, preferably 1,000 to 2,000×g, to separate an uppermost rubber phase (hereinafter, also referred to simply as rubber phase) and a lower phase other than the rubber phase (aqueous phase). Rubber particles having a particle size of 900 to 1,200 nm, preferably 950 to 1,100 nm, can be fractionated from the rubber phase obtained in the first centrifugation.

In a possible embodiment of the first centrifugation, the natural rubber latex is centrifuged at a force of 800 to 1,600×g, preferably 800 to 1,200×g, to separate a rubber phase and an aqueous phase, and the aqueous phase is then centrifuged at a force of 1,800 to 3,000×g, preferably 1,800 to 2,200×g, to separate a rubber phase and an aqueous phase. When the first centrifugation is performed in two stages as described above, the effects of the present invention can be further suitably achieved.

In the second centrifugation, the aqueous phase obtained in the first centrifugation is centrifuged at a force of 6,500 to 10,000×g, preferably 7,500 to 9,000×g, to separate a rubber phase and an aqueous phase. Rubber particles having a particle size of 400 to 700 nm, preferably 400 to 550 nm, can be fractionated from the rubber phase obtained in the second centrifugation.

In the third centrifugation, the aqueous phase obtained in the second centrifugation is centrifuged at a force of 17,000 to 22,000×g, preferably 18,500 to 21,000×g, to separate a rubber phase and an aqueous phase. Rubber particles having a particle size of 150 to 250 nm, preferably 150 to 200 nm, can be fractionated from the rubber phase obtained in the third centrifugation.

In the fourth centrifugation, the aqueous phase obtained in the third centrifugation is centrifuged at a force of 40,000 to 60,000×g, preferably 45,000 to 55,000×g, to separate a rubber phase and an aqueous phase. Rubber particles having a particle size of 50 to 150 nm, preferably 75 to 150 nm, can be fractionated from the rubber phase obtained in the third centrifugation.

As described above, in the present invention, the natural rubber latex is preferably centrifuged in five stages at forces of 800 to 1,600×g, 1,800 to 3,000×g, 6,500 to 10,000×g, 17,000 to 22,000×g, and 40,000 to 60,000×g.

In the first centrifugation, further stepwise centrifugation may be performed, for example, in such a way that the natural rubber latex is centrifuged at a force of 800 to 1,600×g to separate a rubber phase and an aqueous phase, and the aqueous phase is then centrifuged at a force of 1,800 to 3,000×g to separate a rubber phase and an aqueous phase, as described above. Also in the second to fourth centrifugations, further stepwise centrifugation may be performed similarly at forces within the range specified for each stage. In these cases, centrifugation is preferably performed at stepwise increasing centrifugal forces.

The temperature of centrifugation is not particularly limited, and is preferably 1° or higher, more preferably 3° C. or higher, in view of maintaining the activity of the enzymes on the rubber particles. The temperature of centrifugation is also preferably 10° C. or lower, more preferably 5° C. or lower, particularly preferably 4° C.

The duration of centrifugation is not particularly limited, and is preferably 30 minutes or more, more preferably 45 minutes or more, in view of fractionating rubber particles by particle size with high accuracy. The duration of centrifugation is also preferably 90 minutes or less, more preferably 60 minutes or less.

In the present invention, preferably, a buffer solution is added to the natural rubber latex before centrifugation. The addition of a buffer solution to the natural rubber latex prevents aggregation of the rubber particles.

The buffer solution to be added to the natural rubber latex is not particularly limited, and is preferably a neutral buffer solution. Examples include Tris buffer solutions, phosphate buffer solutions, and HEPES buffer solutions. Preferred among these are Tris buffer solutions.

The pH of the buffer solution is preferably 9 or less, more preferably 8 or less, still more preferably 7.8 or less, but preferably 5 or more, more preferably 6 or more, still more preferably 7.2 or more. The pH of the buffer solution is particularly preferably 7.5. When the pH of the buffer solution falls within the above-described range, aggregation of the rubber particles can be further suitably suppressed, and therefore the effects of the present invention can be further suitably achieved.

The amount of the buffer solution to be added to the natural rubber latex (solids concentration (DRC): 25 to 60% (w/v), preferably 35 to 50% (w/v)) is not particularly limited. In order to further suitably separate rubber particles, the amount of the buffer solution is preferably equal to or less than four times the amount of the natural rubber latex, more preferably equal to or less than the amount of the natural rubber latex, still more preferably equal to or less than one-half of the amount of the natural rubber latex.

The natural rubber latex in this paragraph means natural rubber latex harvested from the plants described later and not treated in any way after harvest. Thus, the amount of the buffer solution to be added means the amount of the buffer solution to be added to the natural rubber latex (untreated) harvested from the plants.

The concentration of the buffer component in the natural rubber latex to which the buffer solution has been added is preferably 0.001 M or more, more preferably 0.01 M or more, still more preferably 0.05 M or more, but preferably 1 M or less, more preferably 0.5 M or less, still more preferably 0.25 M or less, particularly preferably 0.1 M or less.

An antioxidant is preferably added to the buffer solution. The addition of an antioxidant to the buffer solution protects the rubber double bonds and also prevents discoloration of the natural rubber latex, which is believed to be caused by oxidation.

The antioxidant is not particularly limited, and examples include dithiothreitol (DTT) and β-mercaptoethanol. DTT is preferred among these.

The concentration of the antioxidant in the mixture obtained by adding the buffer solution to the natural rubber latex is preferably 0.5 mM or more, more preferably 1 mM or more, still more preferably 2 mM or more, but preferably 10 mM or less, more preferably 8 mM or less, still more preferably 5 mM or less.

The latex from which rubber particles are to be separated may be derived from any plant that produces latex containing rubber. Examples include plants of the genus *Hevea*, such as *Hevea brasiliensis*; plants of the genus *Sonchus*, such as *Sonchus oleraceus, Sonchus asper*, and *Sonchus brachyotus*; plants of the genus *Solidago*, such as *Solidago altissima, Solidago virgaurea* subsp. *asiatica, Solidago virgaurea* subsp. *leipcarpa, Solidago virgaurea* subsp. *leipc arpaf. paludosa, Solidago virgaurea* subsp. *gigantea*, and *Solidago gigantea* Ait. var. *leiophylla* Fernald; plants of the genus *Helianthus*, such as *Helianthus annuus, Helianthus argophyllus, Helianthus atrorubens, Helianthus debilis, Helianthus decapetalus*, and *Helianthus giganteus*; plants of the genus *Taraxacum*, such as *Taraxacum, Taraxacum venustum* H. Koidz, *Taraxacum hondoense* Nakai, *Taraxacum platycarpum* Dahlst, *Taraxacum japonicum, Taraxacum officinale* Weber, and *Taraxacum koksaghyz*; plants of the genus *Ficus*, such as *Ficus carica, Ficus elastica, Ficus pumila* L., *Ficus erecta* Thumb., *Ficus ampelas* Burm. f., *Ficus benguetensis* Merr., *Ficus irisana* Elm., *Ficus microcarpa* L. f., *Ficus septica* Burm. f., and *Ficus benghalensis*; plants of the genus *Parthenium*, such as *Parthenium argentatum, Parthenium hysterophorus*, and *Parthenium hysterophorus*; and *Lactuca serriola* and Indian banyan. The plant is preferably at least one selected from the group consisting of plants of the genera *Hevea, Sonchus, Taraxacum*, and *Parhenium*, among others, and more preferably is at least one selected from the group consisting of *Hevea brasiliensis, Sonchus oleraceus, Parthenium argentatum*, and *Taraxacum koksaghyz*.

The present inventors also conducted various studies to maintain the rubber synthesis activity of rubber particles in natural rubber latex.

As a result of the studies, the present inventors focused on the fact that since brown discoloration of the latex is observed at the moment of opening a stored or transported latex-containing container, and polyphenol oxidase is present in the latex, oxidation of the latex or rubber particles causes reduction in the rubber synthesis activity of the rubber particles. The present inventors found that by adding a buffer solution and an antioxidant to the latex and freezing the mixture, the oxidation is suppressed and therefore the rubber synthesis activity of the rubber particles can be maintained.

Such a method, which can prevent oxidation of the latex or rubber particles and maintain the rubber synthesis activity of the rubber particles, provides an important tool for further efficiently synthesize natural rubber.

(Method for Transporting Rubber Particles)

The method for transporting rubber particles of the present invention includes a step 1-1 of adding a buffer solution and an antioxidant to natural rubber latex or rubber particles fractionated from natural rubber latex, and a step 1-2 of freezing a mixture prepared in the step 1-1. The steps 1-1 and 1-2 suppress oxidation of natural rubber latex or rubber particles fractionated from natural rubber latex, thereby allowing the rubber synthesis activity of the rubber particles to be maintained.

(Step 1-1)

In the step 1-1 in the transportation method of the present invention, a buffer solution and an antioxidant are added to natural rubber latex or rubber particles fractionated from natural rubber latex to prepare a mixture containing these components. This suppresses oxidation of the natural rubber latex or rubber particles fractionated from natural rubber latex in a stable manner so that the rubber synthesis activity of the rubber particles can be maintained for a long time.

The antioxidant used in the transportation method of the present invention may be any antioxidant that itself does not reduce the rubber synthesis activity of rubber particles. The antioxidant is preferably one containing a mercapto group, and examples include DTT and β-mercaptoethanol, which are described for the method for fractionating rubber particles. DTT is particularly preferred because only a small amount of DTT is required due to its high antioxidant ability and thus has a small effect on rubber particles.

In the transportation method of the present invention, the concentration of the antioxidant in the mixture is preferably 10 mM or less, more preferably 5 mM or less, still more preferably 3 mM or less, particularly preferably 2 mM or less. With a concentration of more than 10 mM, the disulfide bond of the enzymes may dissociate, so that their activity may be reduced. The lower limit of the concentration is not particularly limited, and is preferably 0.1 mM or more, more preferably 1 mM or more. With a concentration of less than 0.1 mM, oxidation of the natural rubber latex or rubber particles fractionated from natural rubber latex may not be prevented.

In the transportation method of the present invention, the buffer solution to be added to the natural rubber latex is not particularly limited. Similarly to the method for fractionating rubber particles, the buffer solution is preferably a neutral buffer solution, and examples include Tris buffer solutions, phosphate buffer solution, and HEPES buffer solutions. Tris buffer solutions are particularly preferred because they have a small effect on rubber particles.

Similarly to the method for fractionating rubber particles, the buffer solution used in the transportation method of the present invention preferably has a pH of 9 or less, more preferably 8 or less, still more preferably 7.8 or less, but preferably 5 or more, more preferably 6 or more, still more preferably 7.2 or more, and particularly preferably has a pH of 7.5. When the pH of the buffer solution falls within the above-described range, aggregation of the rubber particles can be further suitably suppressed.

When natural rubber latex is used in the transportation method of the present invention, the amount of the buffer solution to be added to the natural rubber latex (solids concentration (DRC): 25 to 60% (w/v), preferably 35 to 50% (w/v)) is not particularly limited, and is preferably equal to or less than four times the amount of the natural rubber latex, more preferably equal to or less than the amount of the natural rubber latex, still more preferably equal to or less than one-half of the amount of the natural rubber latex. The amount of the buffer solution is also preferably equal to or more than one twentieth of the amount of the natural rubber latex, more preferably equal to or more than one tenth of the amount of the natural rubber latex. When the amount is more than four times the amount of the natural rubber latex, an excessive amount of work and time may be required to fractionate the rubber particles, which may result in a reduction in the rubber synthesis activity of the rubber particles. When the amount is less than one twentieth of the amount of the natural rubber latex, the pH of the resulting solution after addition may differ from the pH of the buffer solution added.

The natural rubber latex in this paragraph means natural rubber latex harvested from the plants described later and not treated in any way after harvest. Thus, the amount of the buffer solution to be added means the amount of the buffer solution to be added to the natural rubber latex (untreated) harvested from the plants.

In the transportation method of the present invention, similarly to the method for fractionating rubber particles, the concentration of the buffer component in the natural rubber latex to which the buffer solution has been added is preferably 0.001 M or more, more preferably 0.01 M or more, still more preferably 0.05 M or more, but preferably 1 M or less, more preferably 0.5 M or less, still more preferably 0.25 M or less, particularly preferably 0.1 M or less. At a concentration of less than 0.001 M, the buffer solution may not be functioning, while at a concentration of more than 1 M, the buffer solution may inhibit the enzymatic activity.

The natural rubber latex or rubber particles fractionated from natural rubber latex used in the transportation method of the present invention may be derived from any plant that produces latex containing rubber. Examples of plants that can be used include latex sources as described for the method for fractionating rubber particles. Moreover, the rubber particles can be prepared, for example, by the above-described fractionation method.

(Step 1-2)

In the step 1-2 in the transportation method of the present invention, the mixture containing the above components, prepared in the step 1-1 is frozen. This further stably suppresses the oxidation so that the rubber synthesis activity of the rubber particles can be maintained for a long time.

In the transportation method of the present invention, the mixture may be frozen at any time after completion of the step 1-1. Preferably, the mixture is frozen within 12 hours, more preferably within three hours, still more preferably within 30 minutes, after harvest of the natural rubber latex from plants by tapping. When the mixture is frozen after more than 12 hours, the rubber particles may be excessively oxidized and therefore the effects of the present invention may not be sufficiently achieved.

In the transportation method of the present invention, freezing may be carried out in any way, such as using a freezer, dry ice, or liquid nitrogen.

In the transportation method of the present invention, the freezing temperature is not particularly limited, and is preferably $-10°$ C. or lower, more preferably $-20°$ C. or lower. The lower limit of the freezing temperature is not particularly limited. Shorter durations of freezing are preferred to suppress reduction in the rubber synthesis activity of rubber particles. Moreover, the temperature during transportation is preferably maintained at $-10°$ C. or lower, more preferably at $-20°$ C. or lower.

In the transportation method of the present invention, the natural rubber latex or rubber particles prepared (frozen) in the steps 1-1 and 1-2 are transported. The transportation may be carried out by any means, such as a car, ship, or plane.

(Method for Preserving Rubber Particles)

The preservation method of the present invention includes a step 2-1 of adding a buffer solution and an antioxidant to natural rubber latex or rubber particles fractionated from natural rubber latex, and a step 2-2 of freezing a mixture prepared in the step 2-1. The steps 2-1 and 2-2 suppress oxidation of natural rubber latex or rubber particles fractionated from natural rubber latex, thereby allowing the rubber synthesis activity of the rubber particles to be maintained.

(Step 2-1)

In the step 2-1 in the preservation method of the present invention, a buffer solution and an antioxidant are added to natural rubber latex or rubber particles fractionated from natural rubber latex to prepare a mixture containing these components. This suppresses oxidation of the natural rubber latex or rubber particles fractionated from natural rubber latex in a stable manner so that the rubber synthesis activity of the rubber particles can be maintained for a long time.

In the step 2-1 in the preservation method of the present invention, the same materials and conditions as those used in the step 1-1 in the method for transporting rubber particles can be suitably used, such as the plants from which the natural rubber latex or rubber particles fractionated from natural rubber latex are derived, the type and concentration of the antioxidant, the type, pH and addition amount of the buffer solution, and the concentration of the buffer component.

(Step 2-2)

In the step 2-2 in the preservation method of the present invention, the mixture containing the above components, prepared in the step 2-1 is frozen. This further stably suppresses the oxidation so that the rubber synthesis activity of the rubber particles can be maintained for a long time.

In the preservation method of the present invention, freezing may be carried out in anyway, such as using a freezer, dry ice, or liquid nitrogen.

In the preservation method of the present invention, the freezing temperature is not particularly limited, and is preferably −10° C. or lower, more preferably −20° C. or lower, still more preferably −60° C. or lower, particularly preferably −80° C. or lower. The lower limit of the freezing temperature is not particularly limited. Shorter durations of freezing are preferred to suppress reduction in the rubber synthesis activity of rubber particles.

In the preservation method of the present invention, the mixture may be frozen at any time after completion of the step 2-1. Preferably, the mixture is frozen within five hours, more preferably within four hours, still more preferably within two hours, particularly preferably within one hour, most preferably within 30 minutes, after completion of the step 2-1. When the mixture is frozen after more than five hours, the rubber particles may be excessively oxidized and, further, protease may decompose the enzymes, and therefore the effects of the present invention may not be obtained.

EXAMPLES

The present invention is specifically described with reference to, but not limited to, examples below. In all the examples, natural rubber latex from *Hevea brasiliensis* was used directly after harvest, without any treatment.

<Method for Fractionating Rubber Particles by Particle Size>

A latex solution for rubber particle fractionation was prepared by adding 100 mL of a 1 M Tris buffer solution (pH 7.5) containing 20 mM dithiothreitol (DTT) to 900 mL of natural rubber latex. The latex solution was prepared in an amount of 2 L in total.

A portion of 35 mL out of the 2 L latex solution for rubber particle fractionation was firstly centrifuged for 45 minutes at 4° C. and 1,000×g. After the centrifugation, a hole was made with a spatula in a rubber particle phase 1 separated as an upper phase, and an aqueous phase 1 containing unseparated rubber particles was recovered. The remaining rubber particle phase 1 (about 2.1 g) was resuspended in a 1.5-fold volume (3.1 mL) of a 100 mM Tris buffer solution (pH 7.5) containing 2 mM DTT to give a fraction of rubber particles 1 (RP 1).

The recovered aqueous phase 1 was further centrifuged for 45 minutes at 4° C. and 2,000×g. After the centrifugation, a hole was made with a spatula in a rubber particle phase 2 separated as an upper phase, and an aqueous phase 2 containing unseparated rubber particles was recovered. The remaining rubber particle phase 2 (about 3.0 g) was resuspended in a 1.5-fold volume (4.5 mL) of a 100 mM Tris buffer solution (pH 7.5) containing 2 mM DTT to give a fraction of rubber particles 2 (RP 2).

The recovered aqueous phase 2 was further centrifuged for 45 minutes at 4° C. and 8,000×g. After the centrifugation, a hole was made with a spatula in a rubber particle phase 3 separated as an upper phase, and an aqueous phase 3 containing unseparated rubber particles was recovered. The remaining rubber particle phase 3 (about 3.0 g) was resuspended in a 1.5-fold volume (4.5 mL) of a 100 mM Tris buffer solution (pH 7.5) containing 2 mM DTT to give a fraction of rubber particles 3 (RP 3).

The recovered aqueous phase 3 was further centrifuged for 45 minutes at 4° C. and 20,000×g. After the centrifugation, a hole was made with a spatula in a rubber particle phase 4 separated as an upper phase, and an aqueous phase 4 containing unseparated rubber particles was recovered. The remaining rubber particle phase 4 (about 1.1 g) was resuspended in a 1.5-fold volume (1.62 mL) of a 100 mM Tris buffer solution (pH 7.5) containing 2 mM DTT to give a fraction of rubber particles 4 (RP 4).

The aqueous phase 4 was further centrifuged for 45 minutes at 4° C. and 50,000×g. After the centrifugation, a hole was made with a spatula in a rubber particle phase 5 separated as an upper phase, and an aqueous phase 5 was recovered. The remaining rubber particle phase 5 (about 0.16 g) was resuspended in a 1.5-fold volume (0.24 mL) of a 100 mM Tris buffer solution (ph 7.5) containing 2 mM DTT to give a fraction of rubber particles 5 (RP 5).

The particle size of the fractionated rubber particles (RPs 1 to 5) was determined using a zeta-potential & particle size analyzer ELSZ available from Photal (Otsuka Electronics Co., Ltd).

TABLE 1

| Fraction | Centrifugal force (×g) for fractionation | Average particle size (nm) |
|---|---|---|
| RP 1 | 1,000 | 958.3 ± 21.5 |
| RP 2 | 2,000 | 935.6 ± 12.6 |
| RP 3 | 8,000 | 486.8 ± 4.3 |
| RP 4 | 20,000 | 184.2 ± 2.2 |
| RP 5 | 50,000 | 123.7 ± 0.7 |

Table 1 shows that RP 1 has an average particle size of 958.3 nm with a particle size standard deviation of 21.5 nm. The particle sizes of RP 2 to RP 5 are shown in the same manner.

Table 1 shows that large variations in average particle size between the rubber particles fractionated from the latex by the centrifugation stages were observed, particularly between the rubber particles (LRP) fractionated at 8,000×g or lower and the rubber particles (SRP) fractionated at 20,000×g or higher. This demonstrates that stepwise centrifugation of the latex allowed different sized rubber particles to be fractionated.

The rubber synthesis activity of the recovered rubber particles was determined as follows: First, 50 mM Tris-HCl (pH 7.5), 2 mM DTT, 5 mM $MgCl_2$, 15 μM farnesyl diphosphate (FPP), 100 μM 1-$^{14}$C-isopentenyl diphosphate ([1-$^{14}$C]IPP) (specific activity: 5 Ci/mol), and 10 μL of the rubber particle solution were mixed to prepare a reaction solution (100 μL in total). The reaction solution was reacted at 30° C. for 10 minutes.

After the reaction, 200 μL of saturated NaCl was added to the solution, and the mixture was extracted with 1 mL of diethyl ether to extract isopentenol and the like. Next, polyprenyl diphosphates were extracted from the aqueous phase with 1 mL of BuOH saturated with saline, and then an ultra-long-chain polyisoprenoid (natural rubber) was further extracted from the aqueous phase with 1 mL of toluene/hexane (1:1). The radioactivity of each phase was determined by $^{14}$C counting using a liquid scintillation counter.

TABLE 2

| | $^{14}$C abundance (%) | | | | | |
|---|---|---|---|---|---|---|
| Extract phase | No RP | RP 1 | RP 2 | RP 3 | RP 4 | RP 5 |
| Ether phase | 0.3 | 0.8 | 0.5 | 0.9 | 1.1 | 1.6 |
| BuOH phase | 0.4 | 0.5 | 0.5 | 0.7 | 0.4 | 0.5 |

TABLE 2-continued

| | $^{14}C$ abundance (%) | | | | | |
|---|---|---|---|---|---|---|
| Extract phase | No RP | RP 1 | RP 2 | RP 3 | RP 4 | RP 5 |
| Toluene/Hexane phase | 0.1 | 3.0 | 3.6 | 8.4 | 27.8 | 40.1 |
| Aqueous phase | 99.2 | 95.7 | 95.5 | 89.9 | 70.7 | 57.8 |
| TOTAL | 100.0 | 100.0 | 100.0 | 100.0 | 100.0 | 100.0 |

Table 2 shows that all the RP fractions had rubber synthesis activity (an increase in $^{14}C$ in the toluene/hexane extract phase). This demonstrates that rubber particles having rubber synthesis activity were obtained by the method of the present invention.

The rubber synthesis activity per unit surface area was calculated based on the particle size and the rubber synthesis activity of RP of each fraction. Table 3 shows the results.

TABLE 3

| Fraction | Rubber synthesis activity (%) per unit surface area of RP |
|---|---|
| RP 1 | 100 |
| RP 2 | 103 |
| RP 3 | 116 |
| RP 4 | 172 |
| RP 5 | 272 |

Table 3 shows that rubber particles having a smaller particle size had higher rubber synthesis activity per unit surface area, which demonstrates that rubber particles having different rubber synthesis activities can be fractionated by separating rubber particles by particle size according to the present invention. This means that in the synthesis of rubber from rubber particles, rubber can be efficiently synthesized from a small amount of RP by using small-sized rubber particles selectively fractionated according to the present invention, such as the rubber particles in the RP 4 or RP 5 fraction.

These results demonstrated that the method of the present invention is effective to fractionate rubber particles having rubber synthesis activity from natural rubber latex by particle size.

<Method for Transporting Rubber Particles>

A latex solution for rubber particle fractionation was prepared by adding 100 mL of a 1 M Tris buffer solution (pH 7.5) to 900 mL of natural rubber latex. The latex solution was prepared in an amount of 2 L in total (two 1-L portions). In order to confirm the effect of an antioxidant, DTT was added to one portion to a final concentration of 2 mM, while no antioxidant was added to the other portion.

The two latex solutions thus prepared were frozen on dry ice (frozen at −79° C.) within two hours after harvest of the natural rubber latex from plants by tapping.

The two latex solutions were transported from Thailand to Japan while kept frozen on dry ice. They were transported by air; they were delivered to Japan four days after shipment from Thailand. During the transportation, dry ice was added to keep the latex solutions frozen.

In order to fractionate rubber particles from the two latex solutions, the latex solutions were quickly thawed by immersing the containers containing them in water at 30° C.

The two thawed latex solutions were centrifuged in stages at the following different speeds: 1,000×g, 2,000×g, 8,000×g, 20,000×g, and 50,000×g to fractionate rubber particles. The centrifugation at each speed was carried out at 4° C. for 45 minutes. The rubber particle fractions were resuspended in an equal volume of a 100 mM Tris buffer solution (pH 7.5).

The rubber synthesis activity of the rubber particles recovered at 50,000×g was determined as follows: 50 mM Tris-HCl (pH 7.5), 2 mM DTT, 20 mM potassium fluoride, 5 mM $MgCl_2$, 15 μM farnesyl diphosphate (FPP), 100 μM 1-$^{14}C$-isopentenyl diphosphate ([1-$^{14}C$] IPP) (specific activity: 5 Ci/mol), and 10 μL of the rubber particle solution were mixed to prepare a reaction solution (100 μL in total), and the reaction solution was reacted at 30° C. for 30 minutes.

After the reaction, 200 μL of saturated NaCl was added to the solution, and the mixture was extracted with 1 mL of diethyl ether to extract isopentenol and the like. Next, polyprenyl diphosphates were extracted from the aqueous phase with 1 mL of BuOH saturated with saline, and then an ultra-long-chain polyisoprenoid (natural rubber) was further extracted from the aqueous phase with 1 mL of toluene/hexane (1:1). The radioactivity of each phase was determined by $^{14}C$ counting using a liquid scintillation counter.

TABLE 4

| | Addition of antioxidant before transportation | Rubber synthesis activity (%) |
|---|---|---|
| Comparative Example | Not added | 100 |
| Example | Added | 139 |

Table 4 shows that the rubber synthesis activity of the rubber particles to which DTT had been added before transportation was maintained. This demonstrates that the method involving addition of an antioxidant to natural rubber latex is useful to maintain the rubber synthesis activity of the rubber particles.

Further, in order to compare the preservation conditions of a latex solution after transportation, a latex solution for rubber particle fractionation was prepared by adding 100 mL of a 1 M Tris buffer solution (pH 7.5) containing 20 mM DTT to 900 mL of a latex solution. The latex solution was prepared in an amount of 2 L in total (two 1-L portions).

Immediately after the preparation of the two latex solutions, one latex solution was frozen on dry ice (frozen at −79° C.), while the other was cooled on ice (cooled at 4° C.).

The two latex solutions were transported from Thailand to Japan while kept frozen on dry ice or cooled on ice; they were delivered to Japan four days after shipment from Thailand. During the transportation, dry ice or ice was added to keep the latex solutions frozen or cooled.

In order to fractionate rubber particles from the frozen latex solution, the latex solution was quickly thawed by immersing the container containing it in water at 30° C.

The latex solutions were centrifuged in stages at the following different speeds: 1,000×g, 2,000×g, 8,000×g, 20,000×g, and 50,000×g to fractionate rubber particles. The centrifugation at each speed was carried out at 4° C. for 45 minutes. The rubber particle fractions were resuspended in an equal volume of a 100 mM Tris buffer solution (pH 7.5) containing 2 mM DTT.

The rubber synthesis activity of the rubber particles was measured. The rubber synthesis activity of the rubber particles was determined in the same manner as described above.

TABLE 5

| | Temperature during transportation (° C.) | Rubber synthesis activity (%) |
|---|---|---|
| Comparative Example | 4 (not frozen) | 100 |
| Example | −79 (frozen) | 114 |

Table 5 shows that the rubber synthesis activity of the rubber particles that had been frozen was better maintained. This demonstrates that the method involving freezing of natural rubber latex is useful to maintain the rubber synthesis activity of the rubber particles.

<Method for Preserving Rubber Particles>

A latex solution for rubber particle fractionation was prepared by adding 100 mL of a 1 M Tris buffer solution (pH 7.5) containing 20 mM DTT to 900 mL of natural rubber latex. The latex solution was prepared in an amount of 2 L in total (two 1-L portions).

Immediately after the preparation of the two latex solutions, the latex solutions were frozen on dry ice (frozen at −79° C.)

The two latex solutions were transported from Thailand to Japan while kept frozen on dry ice; they were delivered to Japan four days after shipment from Thailand. During the transportation, dry ice was added to keep the latex solutions frozen.

In order to fractionate rubber particles from the two latex solutions, the latex solutions were quickly thawed by immersing the containers containing them in water at 30° C.

The two thawed latex solutions were centrifuged in stages at the following different speeds: 1,000×g, 2,000×g, 8,000×g, 20,000×g, and 50,000×g to fractionate rubber particles. The centrifugation at each speed was carried out at 4° C. for 45 minutes. The rubber particle fractions were resuspended in an equal volume of a 100 mM Tris buffer solution (pH 7.5). One of the two recovered rubber particle solutions was directly frozen and stored in a freezer at −80° C., while the other was frozen and stored in a freezer at −80° C. after DTT was added to it to a final concentration of 2 mM. They were stored for 2 months. In freezing the two recovered rubber particle solutions, the solutions were frozen in the freezer within 30 minutes after resuspending in the Tris buffer solution.

The rubber particle solutions were thawed again and then the rubber synthesis activity was measured. The rubber synthesis activity of the rubber particles was determined in the same manner as described above.

TABLE 6

| | Addition of antioxidant before storage | Rubber synthesis activity (%) |
|---|---|---|
| Comparative Example | Not added | 100 |
| Example | Added | 107 |

Table 6 shows that the rubber synthesis activity of the rubber particles to which DTT had been added before storage was maintained. This demonstrates that the method involving addition of an antioxidant to natural rubber latex is useful to maintain the rubber synthesis activity of the rubber particles.

One of the two recovered rubber particle solutions was stored at 4° C. without freezing, while the other was frozen and stored at −80° C. After 24-day storage, the rubber synthesis activity of the rubber particles in each solution was measured. The rubber synthesis activity of the rubber particles was determined in the same manner as described above. Both of the rubber particle solutions contained 2 mM DTT.

TABLE 7

| | Temperature during storage (° C.) | Rubber synthesis activity (%) |
|---|---|---|
| Comparative Example | 4 (not frozen) | 100 |
| Example | −80 (frozen) | 141 |

Table 7 shows that the rubber synthesis activity of the rubber particles that had been frozen and stored was better maintained. This demonstrates that the method involving freezing natural rubber latex before storage is useful to maintain the rubber synthesis activity of the rubber particles.

Further, the ratio of the amount of the natural rubber latex to the amount of the buffer solution was varied to study their ratio for efficient recovery of the rubber particles. The buffer solution to be added was prepared to have the following final concentrations: 2 mM DTT and 100 mM Tris-HCl. The resulting latex solutions were stored at −80° C. for 1 month.

After each latex solution was thawed, the rubber particles were recovered under the same centrifugation conditions as described above. Table 8 below shows the amount of the rubber particles recovered at 50,000×g.

TABLE 8

| Ratio (latex:buffer solution) | Amount of natural rubber latex (mL) | Amount of buffer solution (mL) | Recovery amount of rubber (mg) | Recovery rate of rubber particles (mg/mL) |
|---|---|---|---|---|
| 9:1 | 90 | 10 | 990 | 11 |
| 1:0.5 | 67 | 33 | 660 | 10 |
| 1:1 | 50 | 50 | 560 | 11 |
| 1:4 | 20 | 80 | 160 | 8.5 |
| 1:9 | 10 | 90 | 40 | 4 |

Table 8 shows that, in order to efficiently recover the rubber particles after storage, it is desirable that the amount of the buffer solution to be added to the natural rubber latex before storage should be equal to or less than four times the amount of the latex. It is shown that when an excessive amount of the buffer solution was added, after centrifugation the rubber particle phase was not solidly formed and the solution was still cloudy, and consequently the recovery amount of the rubber particles was reduced.

INDUSTRIAL APPLICABILITY

According to the present invention, rubber particles can be fractionated from natural rubber latex by particle size to prepare a natural rubber latex having a high content of rubber particles of a desired size. This is useful particularly in the field of production and manufacture of natural rubber.

Further, according to the present invention, rubber particles can be preserved or transported while maintaining their rubber synthesis activity. This is useful particularly in the field of production and manufacture of natural rubber.

The invention claimed is:

1. A method for fractionating rubber particles in natural rubber latex by particle size, the method comprising adding a buffer solution to natural rubber latex and centrifuging the natural rubber latex in at least four stages at forces of 800 to 3,000×g, 6,500 to 10,000×g, 17,000 to 22,000×g, and 40,000 to 60,000×g to fractionate rubber particles, wherein the buffer solution is added to the natural rubber latex in an amount equal to or less than an amount of the natural rubber latex.

2. The method for fractionating rubber particles according to claim 1, wherein the buffer solution is added to the natural rubber latex in an amount equal to or less than one-half of an amount of the natural rubber latex.

3. The method for fractionating rubber particles according to claim 1, wherein the natural rubber latex is centrifuged in five stages at forces of 800 to 1,600×g, 1,800 to 3,000×g, 6,500 to 10,000×g, 17,000 to 22,000×g, and 40,000 to 60,000×g to fractionate rubber particles.

* * * * *